UNITED STATES PATENT OFFICE.

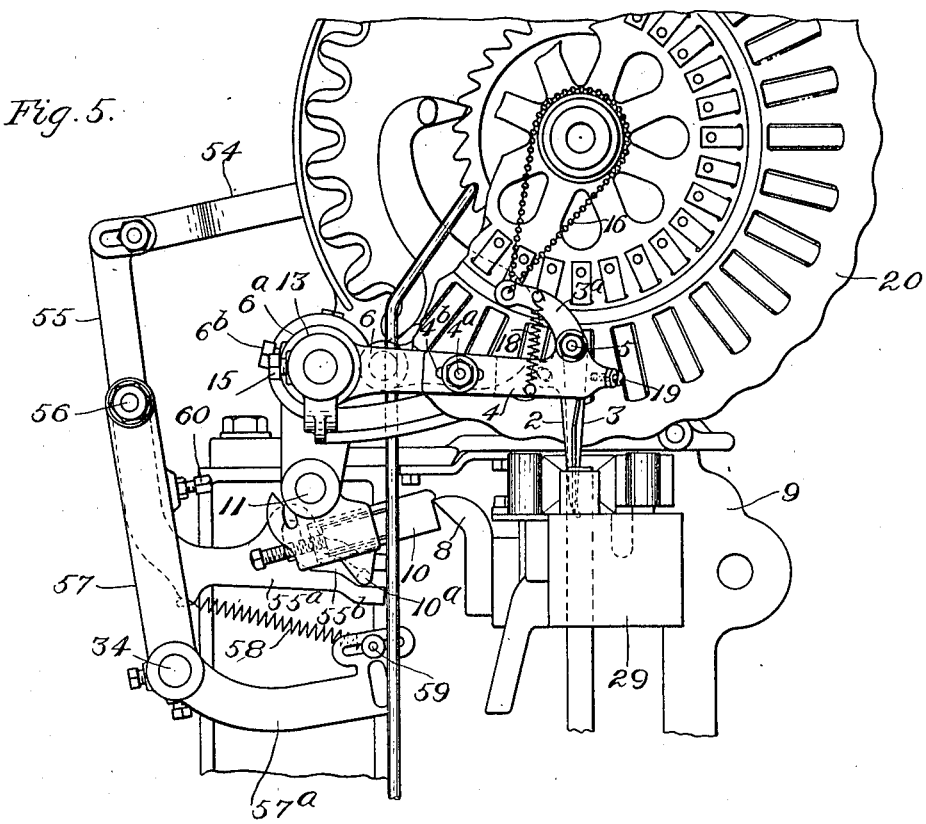

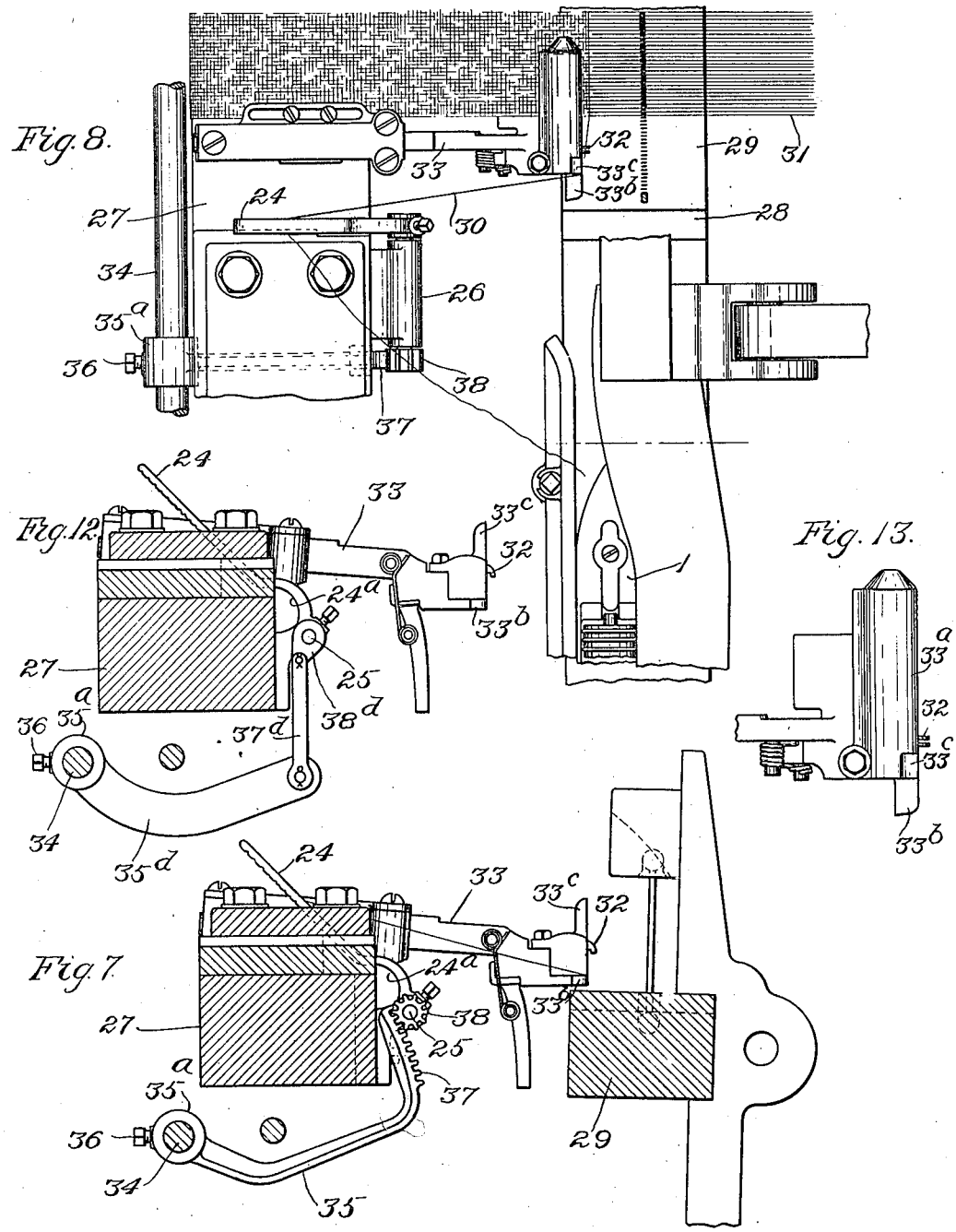

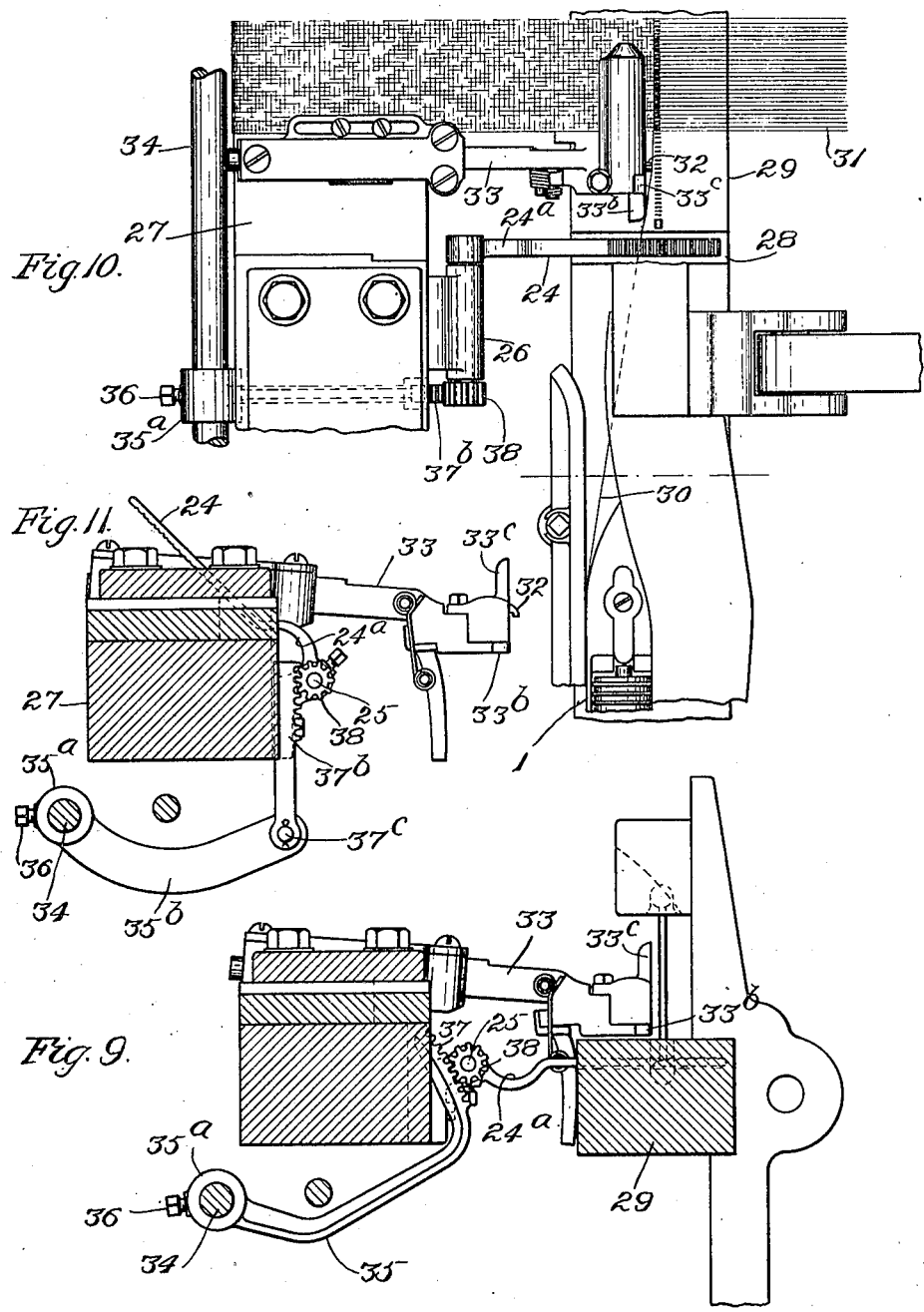

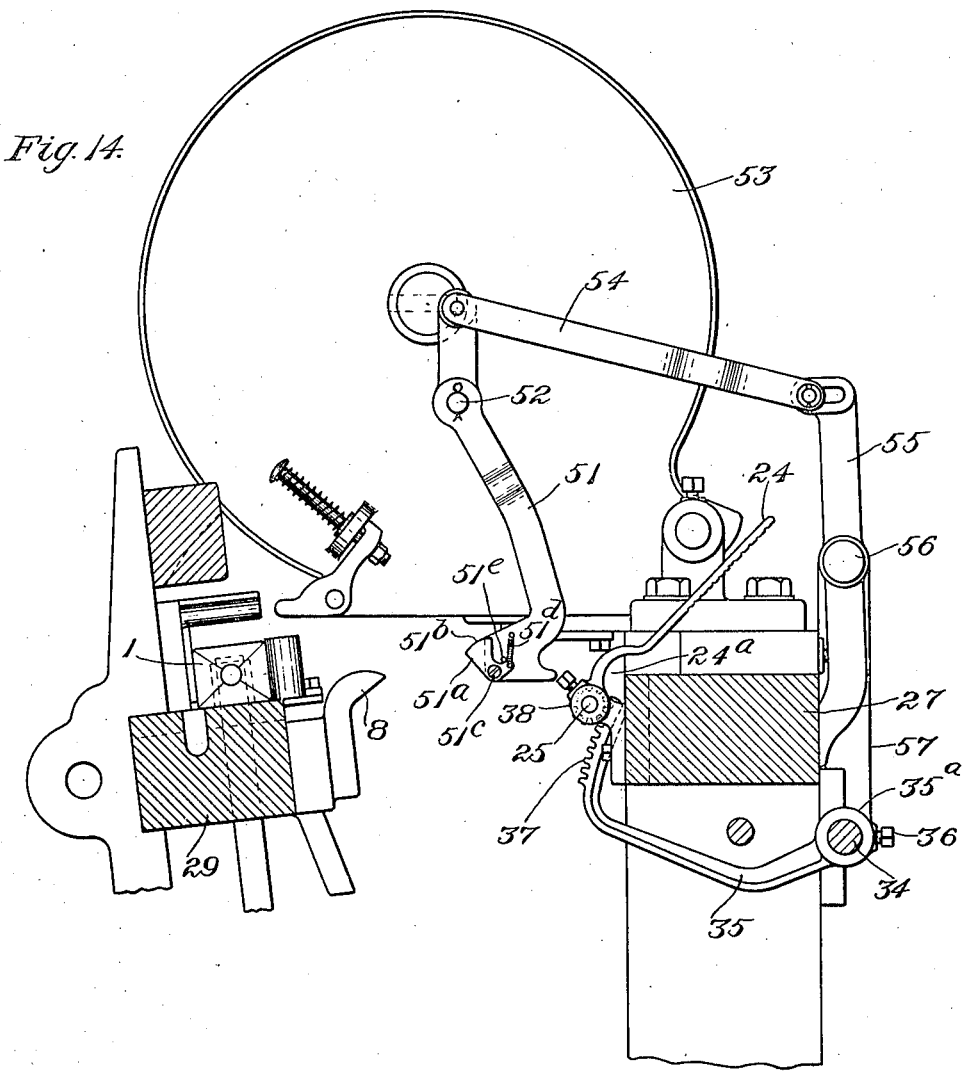

HENRY A. OWEN, OF WHITINSVILLE, MASSACHUSETTS, ASSIGNOR, BY MESNE ASSIGNMENTS, TO DRAPER CORPORATION, OF HOPEDALE, MASSACHUSETTS, A CORPORATION OF MAINE.

WEFT-REPLENISHING LOOM.

1,291,623.　　　　　Specification of Letters Patent.　　Patented Jan. 14, 1919.

Application filed January 3, 1916. Serial No. 69,743.

*To all whom it may concern:*

Be it known that I, HENRY A. OWEN, a citizen of the United States, residing at Whitinsville, in the county of Worcester, State of Massachusetts, have invented a certain new and useful Improvement in Weft-Replenishing Looms, of which the following is a specification, reference being had therein to the accompanying drawings.

The invention has relation, in general, to looms of the class constructed to effect replenishment or change of weft by automatically replacing the weft-carrier contained in the shuttle on the lay of a loom by a reserve weft-carrier loaded with weft. The features of the invention are intended for use in looms in which the replenishment or change is effected prior to complete exhaustion of the supply of weft carried by the weft-carrier contained in the shuttle, as for instance in a loom equipped with a feeler contrived to indicate a predetermined extent of depletion of such supply. It is applicable to looms in which a change of weft is called at predetermined intervals by a pattern-mechanism, or through the action of a counter.

In explaining the invention, I shall refer to the weft-carrier that is contained first in the shuttle, and ejected therefrom at the time of a transfer or change, as the old or spent weft-carrier; and shall refer to its weft as the old weft. The weft-carrier which is transferred into the shuttle from the magazine or feeder will be termed the fresh weft-carrier, and its weft will be referred to as the fresh weft.

The invention comprises weft-parter devices by which the weft extending from the old weft-carrier out through the delivery-eye of the shuttle, and from the said delivery-eye to the selvage of the cloth that is being woven, is parted within the shuttle between the old carrier and the exterior of the shuttle at the time of a transfer, and the portions thereof at both sides of the parting-place are left free so as to permit that portion which remains connected with the old weft-carrier to be carried down with the latter as the same falls after being ejected, and that portion which remains connected with the selvage of the cloth to be withdrawn from the delivery eye of the shuttle, so as thereby to enable both portions to be completely cleared from the shuttle. It includes means adapted to withdraw from the shuttle-eye, after the parting operation, the free end of the portion of weft that remains connected with the selvage of the cloth that is being woven, and further adapted to draw the said free end inward and forward from the shuttle-box and hold the same forward out of the way so as to prevent it from being carried in among the warps to produce defects in the weaving. The said means is adapted to serve also to carry the said portion into the range of action of the usual temple weft-parter or other weft-parter or parters employed to act upon the same at or adjacent the selvage of the cloth. The invention includes, also, an improved shuttle-feeler.

An illustrative embodiment of the invention is shown in the drawings, in which latter,—

Figure 3:
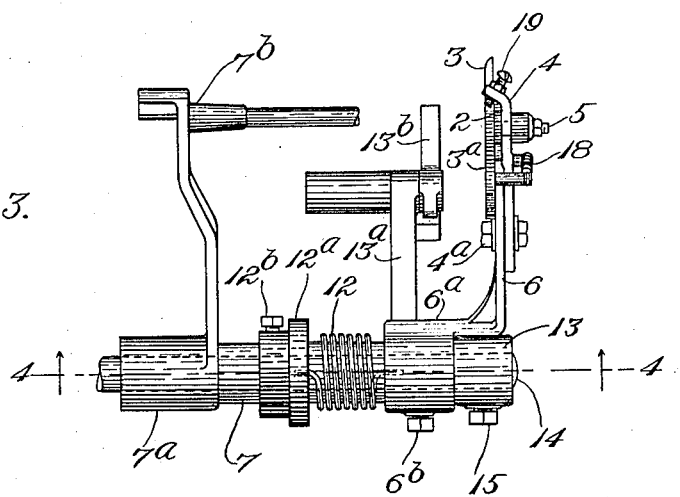

Fig. 3, Sheet 3, is a plan view of the transferrer and the weft-parter device aforesaid.

Figure 4:
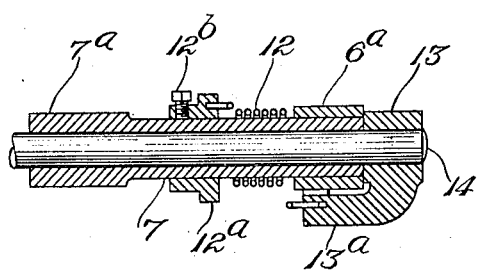

Fig. 4, same sheet, is a view in section in the plane indicated by line 4, 4, Fig. 3.

Figure 1:
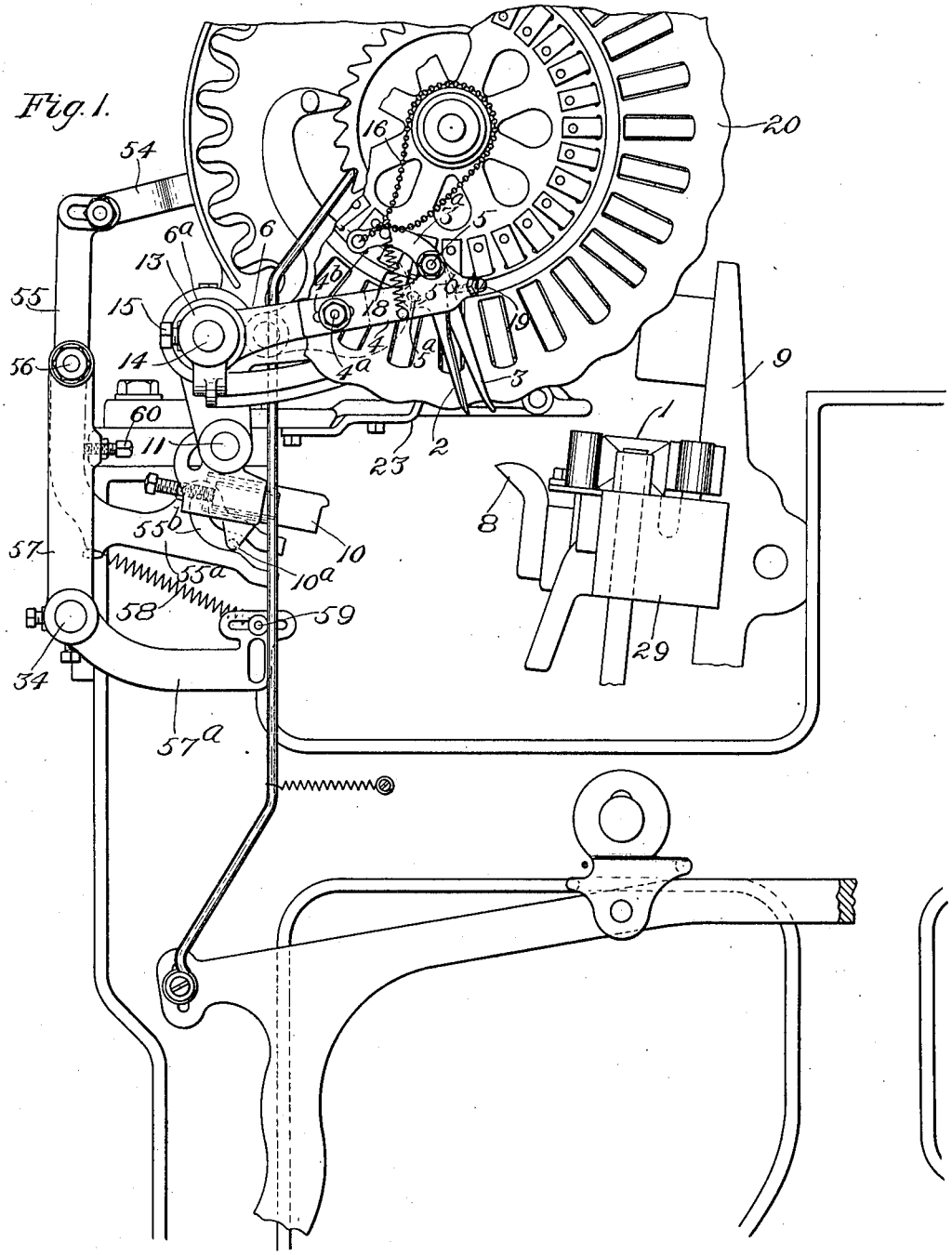
Figure 1 is a side elevation of certain portions of a loom and, more especially, the weft-parter devices which act aforesaid to part the spent weft end within an opening of the shuttle.

Fig. 5, Sheet 4, is a view corresponding substantially with Fig. 1, but showing the parts in the positions assumed by them in the transferring action.

Fig. 6, same sheet, is a plan view of the eye-end of a shuttle, and the weft-parter for the old weft, showing the blades of the said weft-parter depressed within an opening of the shuttle as in Fig. 5.

Fig. 7, Sheet 5, is a view representing the breast-beam and lay-beam in vertical section near the temple, and showing the temple with its selvage weft-parter, and also showing the clearer means for drawing the outstanding portion of the old weft forward into the reach of the selvage weft-parter and also drawing the outer end thereof out from the delivery-eye of the shuttle and from the shuttle-box and moving it forward out of the way.

Fig. 8, same sheet, is a plan view of the parts that are shown in Fig. 7, including portions of the adjacent shuttle-box and a shuttle therein.

Figs. 9 and 10, Sheet 6, are views similar to Figs. 7 and 8, but showing a modification of the means for actuating the clearer arm.

Fig. 11, Sheet 6, and Fig. 12, Sheet 5, are views similar to Figs. 7 and 9, showing other modifications of the said means.

Fig. 13, Sheet 6, is a plan view of the temple-head and its selvage weft-parter.

Fig. 14, Sheet 7, is a view in vertical section looking from the middle of the loom outward toward the replenishing mechanism representing the shuttle-feeder and its relations with the other parts concerned in the invention.

Referring to the drawings:—

The parting device by which the old weft is parted within an opening of the shuttle 1 at the time of a transfer comprises parting-members 2, 3. The said members in this instance normally occupy a position higher than the shuttle-box at the replenishing side of the loom, and the shuttle, as in Fig. 1. They are constructed, arranged and operated to descend as in Fig. 5 so as to cause their end-portions, in an open condition, to enter a cavity or chamber 1ª, Fig. 6, in the shuttle adjacent the delivery-eye 1ᵇ and to receive between them the weft x on its way from the supply carried by the weft-carrier 1ᶜ to the said delivery-eye, then close upon the said weft so as to part or sever the same, and then withdraw from the shuttle. In the present case, the said members are shaped as blades and adapted to be opened and closed like a pair of shears, as well as to act as shears. One of them is fixedly attached to their common support or carrier 4, and the other is pivoted thereto at 5. Their acting end-portions, in an open condition or relation, are caused to enter the opening aforesaid from above at the required time in the transferring operation, when the said opening is presented in position to receive such end-portions. The latter should enter the shuttle-opening in time to part the old weft at substantially the same time as the spent weft-carrier is ejected; that is to say, preferably just a trifle ahead thereof, so that the said weft having been parted, the falling weft-carrier may withdraw entirely clear of the shuttle the unwound portion of weft remaining attached to the said weft-carrier. The entry of the weft-parter into the shuttle-opening should take place, in other words, substantially at the same time, but usually with a slight lead in time, that the transferrer acts to transfer a fresh or reserve weft-carrier into the shuttle and eject from the latter the weft-carrier previously contained therein.

The proper timing of the entry of the weft-parter into the shuttle is such that I find it convenient to utilize the transferrer and its movements down and up again for the support and actuation of the said weft-parter, although the invention is not in all cases restricted to such employment of the transferrer. I herein have provided the support or carrier 4 with an arm or extension which is made fast by a bolt 4ª and a nut and washers to an arm 6 projecting from a hub 6ª mounted upon an outwardly projecting sleeve-like extension 7 of the hub 7ª of the transferrer 7ᵇ. The hub 6ª is made fast to the sleeve-like extension 7 of the transferrer-hub by means of a clamping screw 6ᵇ, so that when the transferrer is depressed through the engagement of the bunter 8 carried by the lay 9 with the dog or latch 10 hung to the depending transferrer arm at 11, the transferrer in its descent will carry the spent weft-parter down with it. The said spent weft-parter will also be raised by and with the transferrer when the latter is swung upward again through the action of the operating spring 12 surrounding the sleeve-like extension 7 of the transferrer hub and having one end thereof engaged with the collar 12ª made fast by a clamping screw 12ᵇ upon the said extension and the other end thereof engaged with the arm 13ª carrying tip-support 13ᵇ and projecting inwardly from a hub 13 mounted upon the outer extremity of the transferrer-supporting stud 14 and made fast upon the said stud by means of a clamping screw 15. As will be perceived, the tension of the spring 12 is capable of being varied to meet requirements by angular adjustment of the collar 12ª upon the sleeve-like extension 7 of the transferrer-hub.

A contracting spiral-spring 18 having one end thereof connected with the tail-portion 3ª of weft-parter member 3, and the other with the support or carrier 4, acts with a tendency to open the movable member 3 away from the fixed member 2, and to hold it open. The movable member 3 of the spent weft-parter is arranged to be closed relative to member 2 in proper time-relation to the entrance of such members into the shuttle-opening, and to the ejection of the old weft-carrier, so as to effect the parting of the old weft prior to the descent of the said weft-carrier. The means of accomplishing the closing and parting or cutting action with proper timing may vary in practice. Herein, the tail portion 3ª of the member 3 is engaged with a chain, or the like, 16, which is looped around the hub of the disk 20 forming part of the rotary magazine or feeder, so that as the said chain tightens during the descent of the weft-parter it causes the movable member to turn on its pivot 5 and thereby close relative to the opposing member 2. As the spent weft-parter rises its members are opened apart from each other, by means of the spring 18, and through the action of the latter they are kept open so long as the spent weft-parter occupies its normal elevated position. Through mounting the arm 6 by means of its hub and a clamping screw 6$^b$ upon the sleeve-like extension of the transferrer-hub, convenient provision is made for adjustment to cause the weft-parter members to descend to the proper extent within the shuttle-opening, and to provide for proper clearance between the weft-parter members 2 and 3 and the top of the shuttle and that of the shuttle-box front as the lay swings forward and rearward with the weft-parter in its upraised position. To provide for proper clearance between the working ends of the weft-parter members 2, 3, and the front and rear walls of the shuttle cavity, the hole in the arm of weft-parter support or carrier 4 for the stem of the bolt 4$^a$ is made as a slot 4$^b$ extending lengthwise of the arm, thus providing for shifting the said support or carrier in the direction from front to rear. The extent of the opening movement of the member 3 away from the member 2 is determined by means of a stop-screw 19 applied to the support or carrier 4 and having one end of the same arranged in position to be encountered by the back of the parter-member 3 as it opens away from the member 2. Thereby the relation of the lower end of member 3 to the back wall of the shuttle opening as such end enters the said opening is adjusted properly. The position of the lower end of fixed member 2 relative to the front wall of the shuttle opening is adjusted by employing bolt 5 as a pivotal mounting for the said member, and employing a screw 5$^a$ for clamping such member to support or carrier 4, with a slot 5$^b$ in the said member receiving the stem of the said screw and providing for angular adjustment of the member about screw 5.

Figure 2:
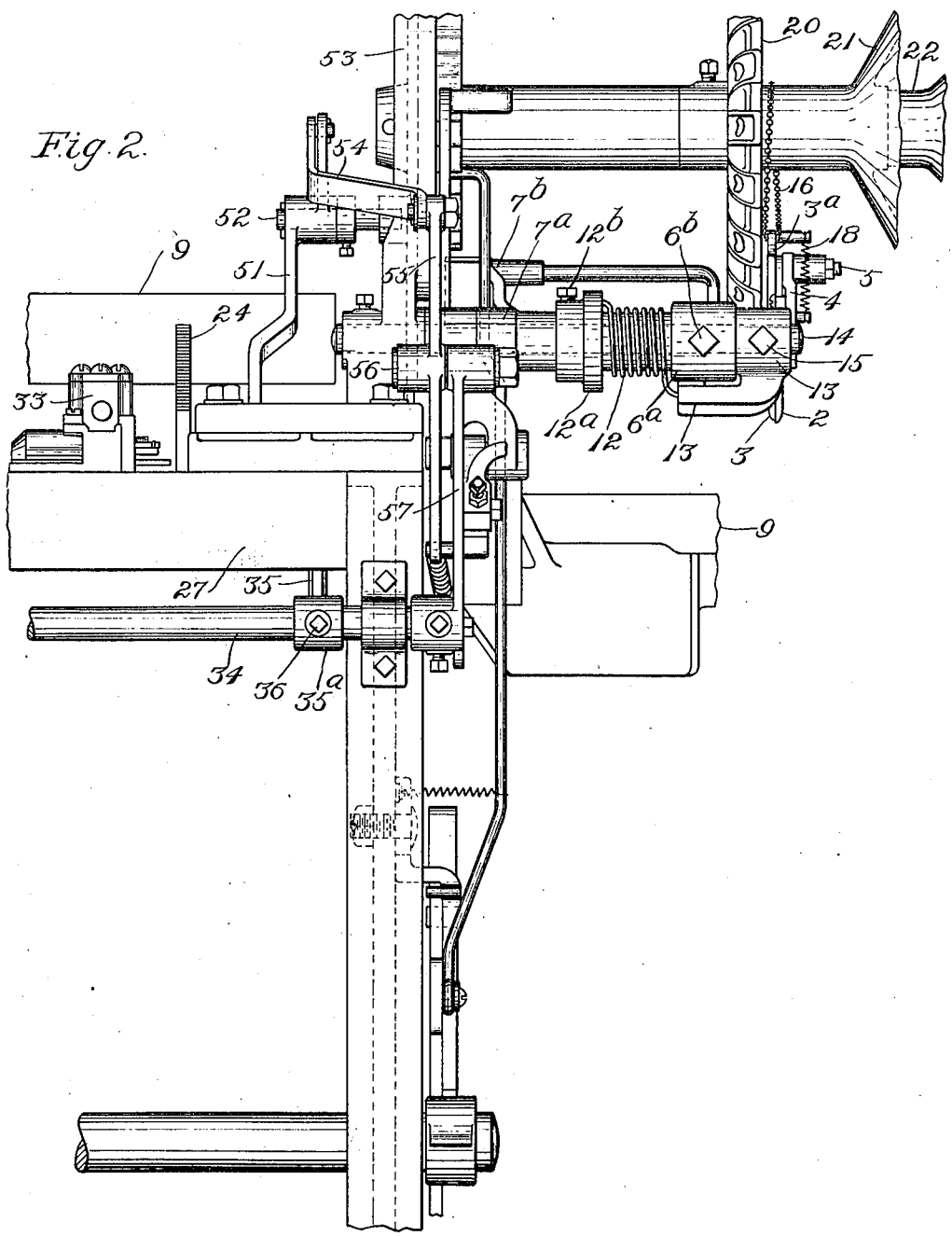
Fig. 2 is a front elevation of certain of the parts that are located at the end of the loom that is partly illustrated in Fig. 1.

The spent weft-parter is located at the outer side of the disk 20 forming a part of the rotary magazine or feeder and serving to support the tips of a series of weft-carriers applied in practice to the said magazine or feeder, and between the said disk 20 and the flaring disk 21 and weft-end attaching hub 22, Fig. 2. The parts 21 and 22 and a portion of the disk 20 are omitted from Figs. 1 and 5, in order that the weft-parter details may more clearly appear in the latter. Usually in practice the outer portion of the weft carried by each weft-carrier mounted in the magazine or feeder is extended in an oblique direction outward from the weft-carrier over the edges of the disks 20 and 21 to the attaching hub 22. In the normal upraised and retracted position of the weft-parter shown in Fig. 1, the lower portion of the member or blade 3 stands in such position that the weft-end extending from the leading weft-carrier in the magazine or feeder across the edges of the disks 20, 21, to the attaching hub 22, such weft-carrier being in contact with the usual fixed end-stop 23, lies against the back of the said member 3, the said edge being slightly recurved as shown in Fig. 1. Thereby the said starting end of the weft carried by the first reserve weft-carrier is detained and prevented from entering between the weft-parter members, so as to prevent it from being acted upon and parted or severed by the weft-parter when the latter is called into action. As the weft-parter and transferrer, together with the said weft-carrier, descend in unison for the purposes of the transferring and weft-parting operations the said starting end of weft remains at the back of the member 3 while the parting of the old weft connected with the weft-carrier previously contained in the shuttle is effected. The rise of the transferrer and weft-parter to their normal elevated position withdraws the weft-parter member 3 from the said starting-end, so that the latter is left free between the attaching hub 22 and the weft-carrier now occupying the shuttle.

The point at which the spent weft is severed within the shuttle may vary more or less with relation to the delivery-eye. The said point may be located in the eye itself or at a point a short distance from the eye proper as in the drawings. In either case, so small a portion of weft will extend from the outside into the said eye or into and through such eye that it will escape or be discharged readily from the shuttle-eye without danger of being detained therein and carried into the shed by the next flight of the shuttle across to the other side of the loom.

To effectually insure the clearing of the free end of the previous weft from the shuttle-eye, I provide a convenient device for withdrawing such end from such eye. The character and construction of this device may vary in practice. Herein I have shown a swinging arm 24 carried by one end of a rock-shaft 25 mounted in a fixed bearing 26 at the back of the breast-beam 27. Normally the arm 24 occupies a position in which it inclines upwardly and forwardly, as in Figs. 7 and 8. This is its retracted position. When replenishment or change is called the said arm is swung or rotated in a vertical plane over and backwardly from its upwardly and forwardly inclined position into a rearwardly extending horizontal position in which it occupies a groove 28 in the lay-beam 29, as in Figs. 9 and 10. When within the said groove the arm is below the shuttle race or top surface of the lay-beam. It assumes this position before the shuttle in its flight from the opposite side of the loom passes from the shed in the warp-threads into the shuttle-box at the replenishing or change side of the loom, and before the lay is fully forward. Consequently the weft-thread which is paid out by the shuttle in its flight extends as at 30, Fig. 10, Sheet 6, from the warp-threads 31, above the arm 24, to the shuttle within the adjacent shuttle-box. Following the parting or severing of the weft 30 within the shuttle, the arm 24 is swung or rotated forwardly so as through its engagement with the weft 30 to take up a bend or bight of the latter and withdraw its outer end from the shuttle and the delivery-eye of the latter. The arm 24 is toothed or notched, as shown, to enable it to engage with the weft 30 with more certainty and prevent the latter from slipping downward along the said arm as it swings or rotates forwardly. This action of the arm 24 may be, and preferably is, utilized to draw the weft 30 into the range of action of the blades 32 of the selvage weft-parter in connection with the adjacent temple 33.

In accordance with my invention I combine the arm 24 operatively with the breast-beam rockshaft 34 so that, through the rocking of the said breast-beam rockshaft 34 to call the transferring instrumentalities into action, the arm 24 shall be swung or rotated rearward into position to engage with the outstanding end of the spent weft, and by the reverse rocking of the breast-beam rockshaft the arm 24 shall be swung or rotated forwardly to take with it the said weft-end. The operative connections between the breast-beam rockshaft and the arm 24 may vary. I may employ an arm 35 mounted by means of a hub 35$^a$ upon the rockshaft 34, made fast thereto by means of a clamping-screw 36, and formed or provided with rack-teeth 37 engaging the teeth of pinion 38 fixed upon rockshaft 25. As a modification, the rack 37$^b$ may be separate from the arm 35$^b$ and connected pivotally to the said arm by means of a pivot 37$^c$, as in Fig. 11, Sheet 6. Or the rockshaft 25 may be formed or provided with a crank-arm 38$^d$, Fig. 12, Sheet 5, having a crank-pin connected by a link 37$^d$ with the arm 35$^d$ made fast upon the breast-beam rockshaft.

The weft-ends looped around the arm 24 work downward toward the rockshaft 25, the arm being formed with a bend or depression 24$^a$ adjacent the said rockshaft, within which the weft-ends hang around the arm when the latter is in its horizontal position, the rear side of the said depression serving to keep the weft-ends from working rearwardly along the arm.

To prevent the weft-end 30 from dropping too low with respect to the parting members of the selvage weft-parter 32, or getting under the head 33$^a$ of temple 33, an outwardly extending projection 33$^b$, is provided upon the lower portion of the outer end of the temple-head. To safeguard against the said weft-end being carried forward over the top of the temple-head, the latter is furnished with an upstanding horn 33$^c$ upon the outer portion of its top.

The shuttle-feeler 51, pivoted at 52 upon the inner side of the upper portion of the fixed stand 53 of the magazine or feeder, (see more particularly Fig. 14, Sheet 7) may be actuated through any approved connections with the breast-beam rockshaft 34, and its functions in detecting failure of the shuttle to enter fully into the shuttle-box, and in preventing the actuation of the transferrer in case the shuttle fails to enter properly into the shuttle-box, are as heretofore. The shuttle-feeler in the present instance performs the additional duty of preventing the spent weft-parter from being actuated in case the shuttle is out of its proper position. Thereby injury to the weft-parter blades or members, or other parts thereof, as a result of the ends of the said blades or members being caused to strike upon some portion of the shuttle, is prevented. This renders it safe to employ weft-parter devices entering into the shuttle for the performance of the parting function. In the present instance the shuttle-feeler is connected by means of a link 54 to the upper arm of a lever 55 which is pivoted at 56 upon an arm 57 fixed upon the breast-beam rockshaft 34 and rising therefrom. By means of a contracting spiral spring 58 engaged with the lower arm 55$^a$ of the lever 55 and also with a stud 59 carried by a branch 57$^a$ of the arm 57, the said lower arm 55$^a$ is held normally in contact with an adjustable stop constituted by a set-screw 60 carried by the arm 57. Arm 55$^a$ is slotted at 55$^b$ and receives a projection or stud 10$^a$ from the holder of the latch 10. Thereby the position of the latch is controlled. Through the connections described, the shuttle-feeler and the latch 10 are combined operatively with the breast-beam rockshaft 34 so that when the said rockshaft is rocked for the purpose of calling a transfer the shuttle-feeler is moved rearward into feeling position, and simultaneously therewith the dog or latch 10 is raised in the path of the engaging portion of the bunter so that as the lay comes forward the bunter may engage the latch and actuate the transferrer and spent weft-parter. The tension of spring 58 is sufficient to hold lever 55 in engagement with stop 60 and to cause such lever to move in unison with arm 57 just as though it were one piece therewith, to thereby call the shuttle-feeler and the dog or latch into operation, provided no encounter between the feeler and the shuttle out of proper position takes place. In case of such encounter as the lay moves forward, the shuttle-feeler will be forced forward and through the connection of the shuttle-feeler with the lever 55 the latter will be turned on its pivotal connection 56 with the arm 57 so as to swing the dog or latch down out of the path of the engaging portion of the bunter on the lay. Thereby the actuation of the transferrer and of the spent weft-parter will be prevented, thus safe-guarding as usual against the bad results following from the attempt to effect the transfer with the shuttle in improper position, and in addition avoiding injury to the spent weft-parter.

The feeler 51 is shown in Fig. 14 as having its working end furnished with a downwardly and forwardly inclined edge 51ª to deflect the weft-end downward below the shuttle-feeler into position to be caught readily by arm 24. Thereby tendency of the shuttle-feeler to carry said weft-end toward or against the back of the shuttle-box is obviated. The shuttle-feeler 51 is formed with a spring-actuated yielding end-portion 51ᵇ. In this instance the said end-portion is pivoted at 51ᶜ upon the shuttle-feeler arm and held normally by means of a contracting spiral-spring 51ᵈ against a stap 51ᵉ carried by the said arm. When the back of the shuttle-box encounters the said yielding end-portion 51ᵇ the latter turns on its pivot 51ᶜ. This yielding capacity of the end-portion 51ᵇ renders delicate adjustment of the position of the shuttle-feeler when moved rearward for feeling purposes unnecessary, obviating breakage or straining of the parts in case the forward movement of the lay should produce an encounter between the shuttle-box back and the acting end of the shuttle-feeler; and obviates also necessity for deeply recessing the shuttle-box back to accommodate the end of the shuttle-feeler.

I claim as my invention:—

1. In a loom, the combination with weft-changing means operating to eject the old weft-carrier from the shuttle and insert a fresh one therein, of a weft-parter which parts the old weft within the shuttle between the old carrier and the exterior of the shuttle, and a weft-clearer operating to withdraw the outer portion of the parted weft from the eye of the shuttle and from the shuttle-box, so as to clear the said eye and also keep the said portion of the parted weft from being carried in among the warps.

2. In a loom, the combination with a selvage weft-parter, and weft-changing means operating to eject the old weft-carrier from the shuttle and insert a fresh one therein, of a weft-parter which parts the old weft within the shuttle betwen the old carrier and the exterior of the shuttle, and a weft-clearer which withdraws the outer portion of the parted weft from the eye of the shuttle and moves the part thereof that is adjacent the selvage into the range of action of the selvage weft-parter.

3. In a loom, the combination with a selvage weft-parter, and a weft-parter operating to part the working weft within the shuttle between the old carrier and the exterior of the shuttle, of a clearer and holder for the portion of weft between the selvage and the point of the parting, by which the parted portion is cleared from the eye of the shuttle, its inner part moved into the range of action of the selvage weft-parter, and the loose piece is held forward out of the way and prevented from being carried in among the warps.

4. In a loom, the combination with weft-changing means operating to eject the old weft carrier from the shuttle and transfer a fresh one thereto, of a weft-parter operated by the transferrer of the weft-changing means by which the old weft is parted within the shuttle between the old carrier and the exterior of the shuttle and the portions thereof at both sides of the parting are freed and thereby permitted to escape from the shuttle, and means for withdrawing from the shuttle-eye the outer portion of the old weft.

5. In a loom, the combination with weft-changing devices, of weft-clearer devices for engaging and moving forward the old weft, comprising a swinging arm mounted upon the frame in front of the lay, a breast-beam rockshaft, and means operatively connecting said swinging arm with the said rockshaft whereby the rocking of the latter swings the arm rearward to receive the said weft and then swings it forward causing it to take the weft with it.

6. In a loom, the combination with weft-changing devices, of weft-clearer devices for engaging and moving forward the old weft, comprising a swinging arm mounted upon the frame in front of the lay, a breast-beam rockshaft, an arm thereon, and means operatively connecting said rockshaft arm with the swinging arm whereby the rocking of the rockshaft swings the swinging arm rearward to receive the said weft and then swings it forward, causing it to take the weft with it.

7. In a loom, the combination with weft-changing devices, of weft-clearer devices for engaging and moving forward the old weft, comprising a weft-engaging arm, a rockshaft mounted upon the loom-frame and carrying such arm, a breast-beam rockshaft, an arm thereon, and means operatively connecting said rock-shaft arm with the clearer rockshaft whereby the rocking of the breast-beam rockshaft rocks the clearer rockshaft to swing the weft-engaging arm rearward into position to receive the old weft, and then swing it forward, causing it to take such weft with it.

8. The combination with a weft-clearer arm, and means to swing the same rearward toward the lay to receive the old or spent weft and forward to carry the said weft forward with it, of a shuttle-feeler having its working end furnished with a downwardly and forwardly inclined edge to deflect the said weft downward below the shuttle-feeler into position to be caught readily by the said arm.

9. In a loom, the combination with a magazine for reserve carriers containing weft, a weft-end holder, and a transferrer, of a weft-parter connected to and moving in unison with the transferrer and comprising relatively movable parting members which part between them the old weft when the transferrer is actuated to effect a transfer, one of such members acting to detain the starting end of weft extending from the fresh carrier to the weft-end holder and prevent the same from being parted.

10. In a loom, the combination with a magazine for reserve carriers containing weft, a weft-end holder, and a transferrer, of a weft-parter connected to and moving in unison with the transferrer and comprising relatively movable parting members which part the old weft between them when the transferrer is actuated to effect a transfer, one of such members constituting a detent for the starting end of the leading carrier in the magazine and acting to prevent such starting end from entering between the parting members and being parted thereby in the transferring and parting operation.

In testimony whereof I affix my signature in presence of two witnesses.

HENRY A. OWEN.

Witnesses:
 CHAS. F. RANDALL,
 ELLEN O. SPRING.